United States Patent
Yamaguchi (10) Patent No.: US 9,417,083 B2
(45) Date of Patent: Aug. 16, 2016

(54) ROUTE CREATION DEVICE

(75) Inventor: Shuhei Yamaguchi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 14/410,213

(22) PCT Filed: Jul. 17, 2012

(86) PCT No.: PCT/JP2012/068101
§ 371 (c)(1),
(2), (4) Date: Dec. 22, 2014

(87) PCT Pub. No.: WO2014/013546
PCT Pub. Date: Jan. 23, 2014

(65) Prior Publication Data
US 2015/0323339 A1  Nov. 12, 2015

(51) Int. Cl.
*G01C 21/36* (2006.01)

(52) U.S. Cl.
CPC ........ *G01C 21/3605* (2013.01); *G01C 21/3614* (2013.01); *G01C 21/3664* (2013.01)

(58) Field of Classification Search
CPC ............... G01C 21/34; G01C 21/3446; G01C 21/3605; G01C 21/3626; G01C 21/3664; G08G 1/096866; G08G 1/0969; G08G 1/096816; G06F 17/30241
USPC ......... 701/533, 532, 117, 414, 423, 425, 435, 701/538, 461; 340/995.1, 995.13, 995.14, 340/995.19
See application file for complete search history.

(56) References Cited

U.S. PATENT DOCUMENTS

| | | | |
|---|---|---|---|
| 7,512,483 B2 | 3/2009 | Matsuoka et al. | |
| 2001/0047241 A1* | 11/2001 | Khavakh | G01C 21/34 701/410 |
| 2005/0055158 A1* | 3/2005 | Machino | G01C 21/3658 701/428 |
| 2006/0276959 A1* | 12/2006 | Matsuoka | G01C 21/3664 701/431 |
| 2009/0292458 A1* | 11/2009 | Nakamura | G01C 21/32 701/532 |
| 2010/0332132 A1* | 12/2010 | Okude | G01C 21/3476 701/414 |
| 2012/0130634 A1* | 5/2012 | Satoh | G01C 21/30 701/461 |
| 2013/0211719 A1 | 8/2013 | Boschker et al. | |

FOREIGN PATENT DOCUMENTS

| | | |
|---|---|---|
| JP | 6-180796 A | 6/1994 |
| JP | 7-91974 A | 4/1995 |
| JP | 2001-74481 A | 3/2001 |
| JP | 2001-108465 A | 4/2001 |
| JP | 2004-28703 A | 1/2004 |
| JP | 2006-267006 A | 10/2006 |
| JP | 2006-308311 A | 10/2006 |
| JP | 2006-308310 A | 11/2006 |
| JP | 2010-151546 A | 7/2010 |
| WO | WO 2011/124272 A1 | 10/2011 |

* cited by examiner

*Primary Examiner* — Marthe Marc-Coleman
(74) *Attorney, Agent, or Firm* — Birch, Stewart, Kolasch & Birch, LLP (57) ABSTRACT

It is an object to provide a technique capable of searching for a route as close to a route intended by a user as possible. A route creation device includes an input unit that accepts a line drawn on a map displayed based on map data, and a link retrieval unit that retrieves corresponding road links that correspond to the line accepted by the input unit from the map data. The route creation device further includes a route searching unit that searches for a route including at least one road link satisfying a predetermined condition among the road links retrieved by the link retrieval unit.

6 Claims, 7 Drawing Sheets

ROUTE CREATION DEVICE

TECHNICAL FIELD

The present invention relates to a route creation device which allows a user to draw a freehand line, for example, on a map displayed based on map data, thereby creating a route.

BACKGROUND ART

In a navigation device and the like, techniques which search map data for a route used for guiding a user from a current location to a destination point (or create the route from the map data) have been used.

A variety of techniques have been proposed in relation to such a route search. For example, Patent Document 1 describes a technique which is based on a line drawn freehand by a user to search for a route close to the drawn line. Patent Document 1 describes the processes of determining the times of arrival for all routes including a route searched for based on the freehand drawn line and its surrounding routes, and then searching for a route based on the times of arrival, when a setting is made so as to search for a route corresponding to the shortest time of arrival.

PRIOR ART DOCUMENT

Patent Document

Patent Document 1: Japanese Patent Application Laid-Open No. 07-091974

SUMMARY OF INVENTION

Problem to be Solved by the Invention

Unfortunately, when a route is searched for based on the times of arrival for all routes as mentioned above, there are cases where the route obtained by the search hardly coincides with the route searched for based on the line drawn by the user. That is, the user has not been able to obtain his or her intended route in some cases.

The present invention has been made to solve the aforementioned problems. It is an object of the present invention to provide a technique capable of searching for a route as close to a route intended by a user as possible.

Means for Solving the Problem

A route creation device according to the present invention includes: a map data storage that stores map data therein; an input unit that accepts a line drawn on a map displayed based on the map data regardless of a setting situation of a destination point or a waypoint; and a link retrieval unit that retrieves, from the map data, corresponding road links that correspond to the line from one end to the other end, the line being accepted by the input unit. The route creation device further includes a route searching unit that searches for a route including at least one road link satisfying a predetermined condition including link continuity and fore-and-aft relation among the road links retrieved by the link retrieval unit.

Effects of the Invention

According to the present invention, a search is made for a route including at least one road link satisfying a predetermined condition among the road links corresponding to a drawn line. Thus, the search is made for a route intended by a user or a route close to the intended route because the search is made for a route passing through the road links corresponding to the drawn line, as much as possible.

DESCRIPTION OF EMBODIMENTS

Embodiment 1

Figure 1:
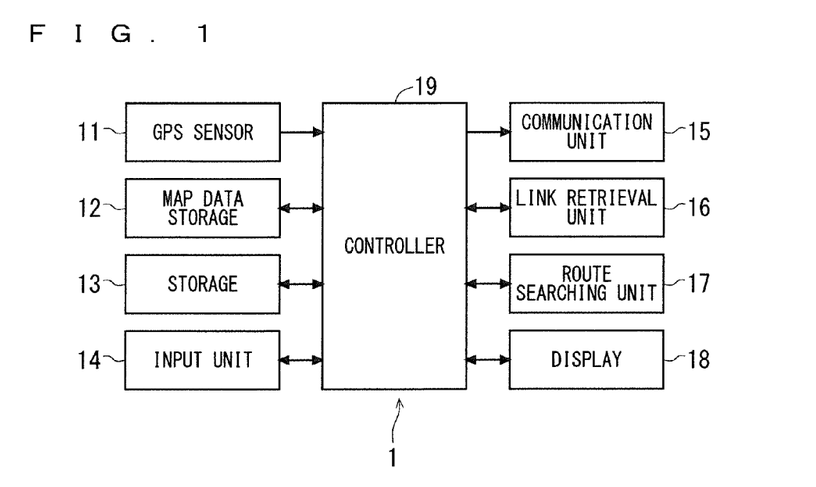
FIG. 1 is a block diagram showing the configuration of a route creation device according to Embodiment 1.

FIG. 1 is a block diagram showing the configuration of a route creation device according to Embodiment 1 of the present invention. This route creation device 1 is a device that creates a route from map data (or searches the map data for a route), and is provided in, for example, a car navigation device, a PND (Portable Navigation Device) and a portable terminal.

As shown in FIG. 1, the route creation device 1 includes a GPS (Global Positioning System) sensor 11, a map data storage 12, a storage 13, an input unit 14, a communication unit 15, a link retrieval unit 16, a route searching unit 17, a display 18, and a controller 19 that controls these components in a centralized manner. The functions of the link retrieval unit 16, the route searching unit 17 and the controller 19 are implemented by the operation of a CPU (Central Processing Unit), for example. Next, the components of the route creation device 1 will be described.

The GPS sensor 11 detects the current position of the route creation device 1 in terms of longitude and latitude, based on a radio signal received from a GPS satellite.

The map data storage 12 stores therein map data including information about a map with coordinates of longitude and latitude, various pieces of information about facilities shown on the map, and various pieces of information (for example, road types and attributes) about road links into which each road shown on the map is divided.

The storage 13 includes a memory, for example, and stores therein various pieces of information necessary for the route creation device 1 to create routes.

The input unit 14 includes an input device that accepts input manipulations from a user, and accepts lines (referred to hereinafter as "freehand lines") drawn freehand with a finger and a pen by the user on a map appearing on the display 18, based on the map data stored in the map data storage 12.

The communication unit 15 receives traffic information (information about traffic jams, accidents, constructions, disasters and the like), for example, from VICS (Vehicle Information and Communication System) (registered trademark) Center.

The link retrieval unit 16 retrieves road links corresponding to a freehand line accepted by the input unit 14 from the map data.

The route searching unit 17 searches for a route including at least one road link satisfying a predetermined condition among the road links retrieved by the link retrieval unit 16.

The display 18 includes a display device that displays various pieces of information to the user, and displays, for example, a map represented by the map data and a route searched for by the route searching unit 17. The input unit 14 and the display 18 may be formed by separate pieces of hardware or by a single piece of hardware such as a touch panel.

Figure 2:
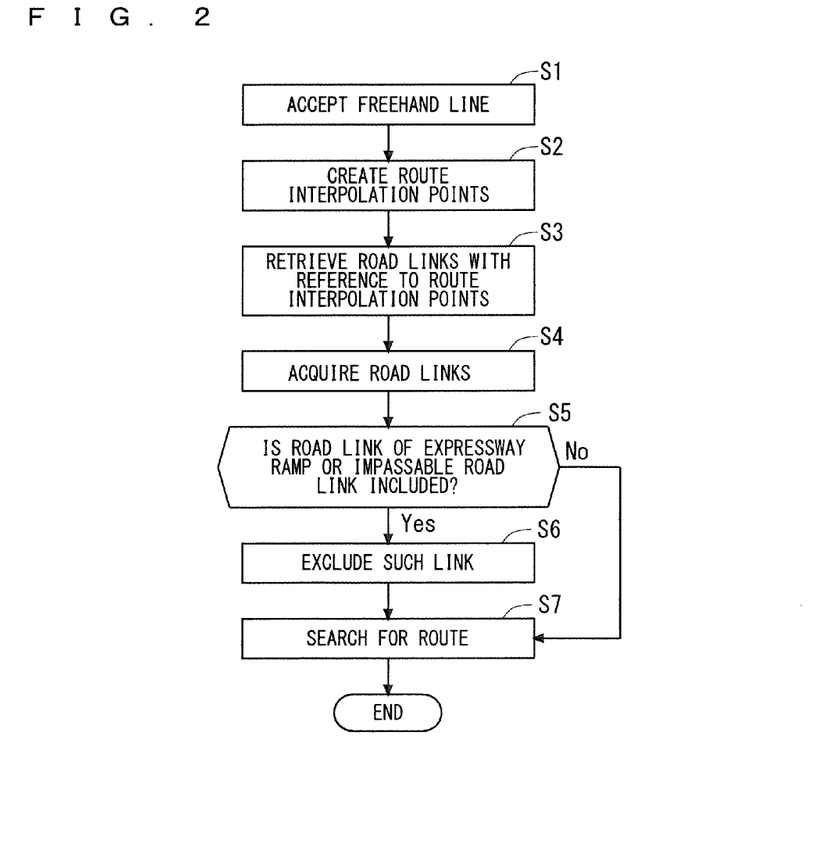
FIG. 2 is a flow diagram showing the operation of the route creation device according to Embodiment 1.

An example of the operation of the route creation device 1 according to Embodiment 1 configured as described above will be described with reference to FIGS. 2 to 7. FIG. 2 is a flow diagram showing the operation of the route creation device 1. FIGS. 3 to 7 are views showing the operation of FIG. 2 step by step.

Figure 3:
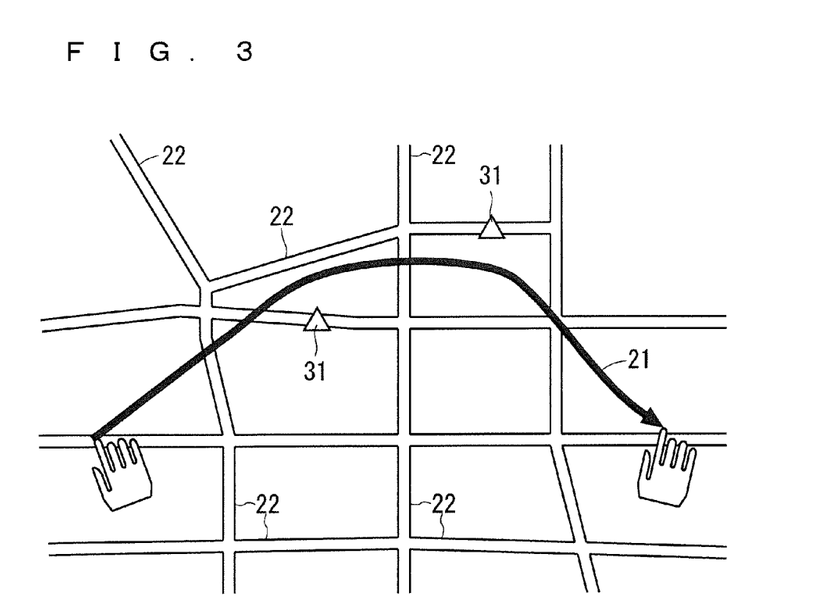
FIG. 3 is a view showing the operation of the route creation device according to Embodiment 1.

First, in Step S1, the input unit 14 accepts a freehand line 21 drawn on a map appearing on the display 18, as shown in FIG. 3. In FIG. 3, road links 22 each corresponding to part of a road divided by adjacent intersections which is defined as a unit are shown, and triangles 31 are attached to impassable road links 22 (for example, road links of a pedestrianized road and a private road). When the input unit 14 accepts a freehand line 21, the display 18 displays the freehand line 21 in such a manner that the freehand line 21 is superimposed on a map represented by the map data. This allows the user to recognize the position in which he or she has drawn the freehand line 21.

Figure 4:
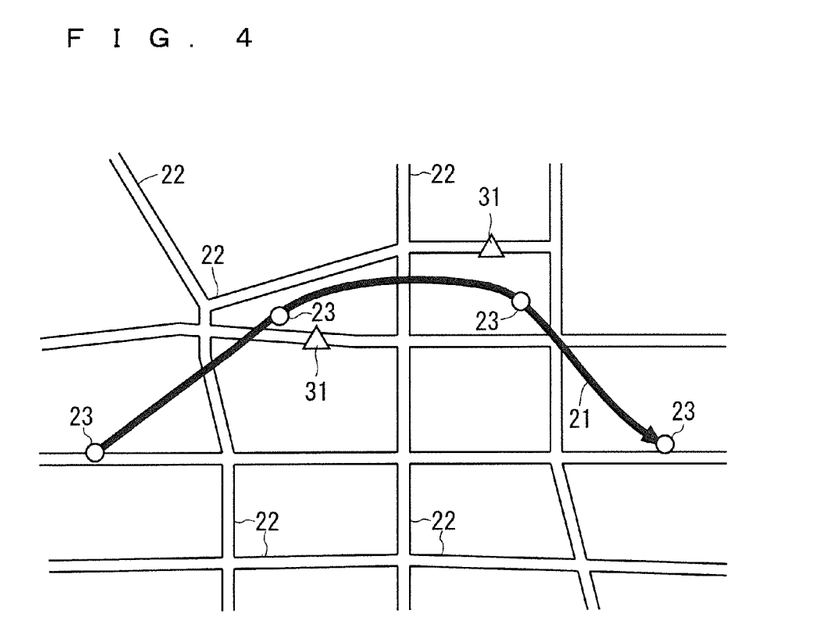
FIG. 4 is a view showing the operation of the route creation device according to Embodiment 1.

In Step S2, the controller 19 creates route interpolation points 23 disposed along the freehand line 21 at equal intervals on the freehand line 21 accepted in Step S1, as shown in FIG. 4.

Figure 5:
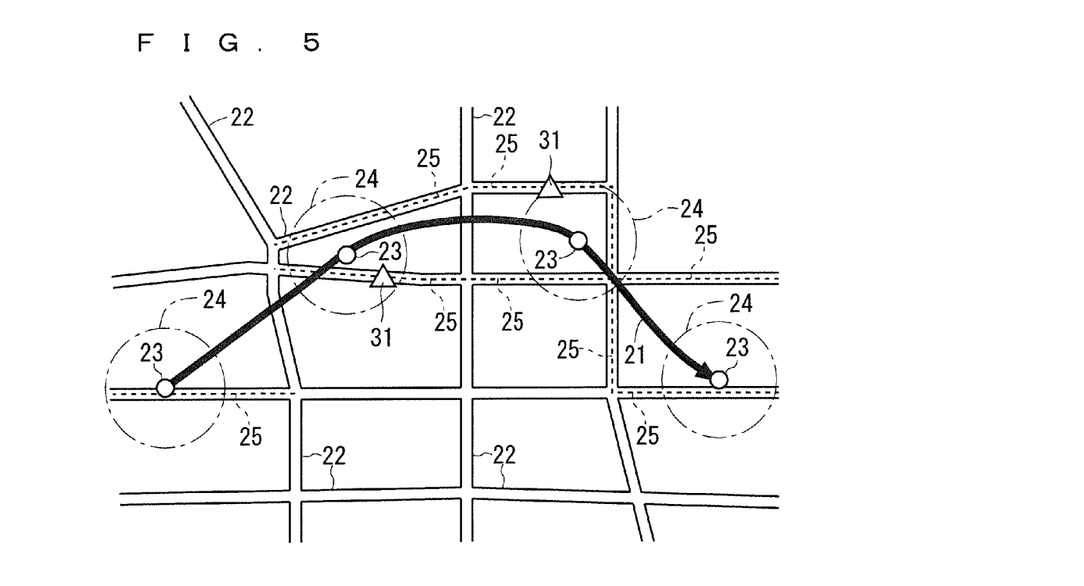
FIG. 5 is a view showing the operation of the route creation device according to Embodiment 1.

In Step S3, the link retrieval unit 16 defines a retrieval range 24 (predetermined range) with reference to each of the route interpolation points 23 created in Step S2, as shown in FIG. 5. Then, the link retrieval unit 16 retrieves road links 22 (road links 22 corresponding to the freehand line 21) positioned within the defined retrieval ranges 24. An example in which the link retrieval unit 16 performs circular retrieval such that the road links 22 are retrieved within the circular retrieval ranges 24 is illustrated in FIG. 5. The retrieval, however, is not limited to this. Instead, the link retrieval unit 16 may perform rectangular retrieval such that the road links 22 are retrieved within rectangular retrieval ranges.

In Step S4, the link retrieval unit 16 acquires the road links 22 positioned within the retrieval ranges 24 as a result of the retrieval of Step S3. The road links 22 acquired in Step S4 shall be referred to as "retrieved links" hereinafter. In FIG. 5, retrieved links 25 acquired in Step S4 are indicated by broken lines. The link retrieval unit 16 stores the acquired retrieved links 25 in the storage 13.

Next, in Steps S5 and S6, retrieved links 25 each of which satisfies the condition (predetermined condition) of not being a predetermined road link to be excluded are identified from among the retrieved links 25 acquired in Step S4.

Specifically, in Step S5, the controller 19 acquires the road types and attributes of the retrieved links 25 stored in the storage 13 from the map data stored in the map data storage 12. Based on the acquired road types and attributes, the controller 19 then judges whether a road link of an expressway ramp or the aforementioned impassable road link is included among the retrieved links 25 in the storage 13 or not. The controller 19 makes this judgment on all of the retrieved links 25 stored in the storage 13. When it is judged that the expressway ramp or the impassable road link is included among the retrieved links 25, the procedure proceeds to Step S6; otherwise, the procedure proceeds to Step S7.

Figure 6:
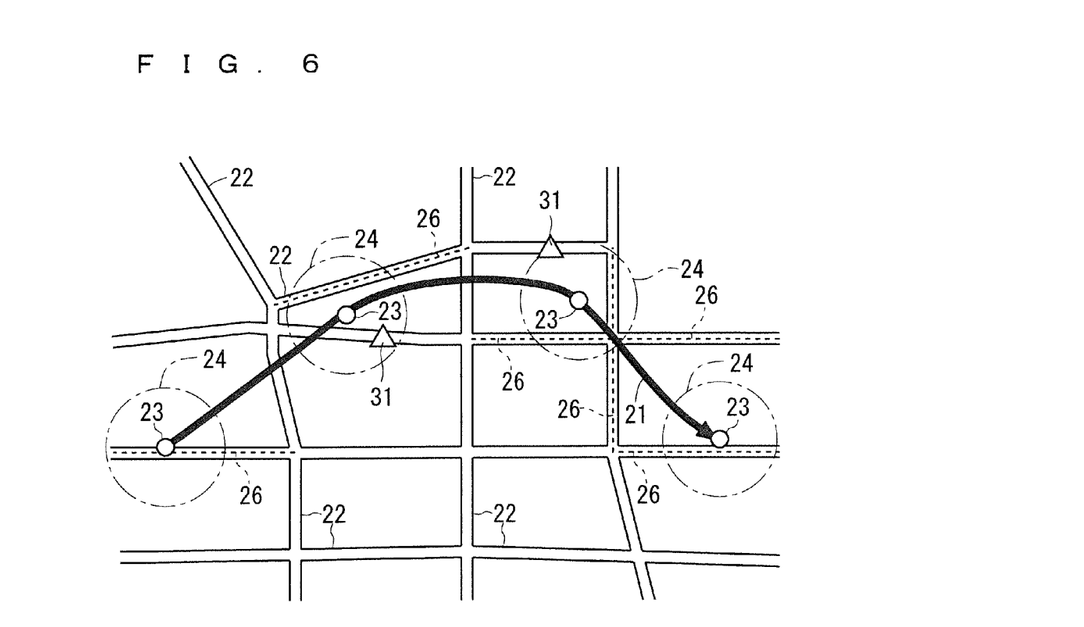
FIG. 6 is a view showing the operation of the route creation device according to Embodiment 1.

In Step S6, the controller 19 excludes the expressway ramp or the impassable road link from among the retrieved links 25 in the storage 13 to identify the remainder of the retrieved links 25. That is, the retrieved links 25 each of which satisfies the condition (predetermined condition) of being neither the road link of the expressway ramp nor the impassable road link are identified. Such retrieved links 25 which satisfy this condition shall be referred to as "condition-satisfied links" hereinafter. In FIG. 6, the condition-satisfied links 26 obtained by excluding the impassable road links 22 marked with the triangles 31 from among the retrieved links 25 shown in FIG. 5 are indicated by broken lines. Thereafter, the procedure proceeds to Step S7.

In Step S7, the route searching unit 17 searches for a route including the condition-satisfied links 26, based on the condition-satisfied links 26 and setting conditions set in relation to the route search. The setting conditions include link continuity and fore-and-aft relation. The route searching unit 17 uses the link continuity and fore-and-aft relation to search for a route including the condition-satisfied links 26.

For example, when one condition-satisfied link 26 is identified for one route interpolation point 23, the route searching unit 17 acquires the one condition-satisfied link 26 as the "condition-satisfied link 26 corresponding to one route interpolation point 23". On the other hand, when a plurality of condition-satisfied links 26 are identified for one route interpolation point 23, the route searching unit 17 determines the shortest distance between an end of a condition-satisfied link 26 identified from an adjacent route interpolation point 23 and ends of the plurality of condition-satisfied links 26 to acquire one of the plurality of condition-satisfied links 26, whose the distance is shortest, as the "condition-satisfied link 26 corresponding to one route interpolation point 23". The route searching unit 17 performs the aforementioned acquisition operation on each of the route interpolation points 23 to acquire the condition-satisfied links 26 satisfying the link continuity and fore-and-aft relation. When adjacent condition-satisfied links 26 satisfying the link continuity and fore-and-aft relation are distant from each other, the route searching unit 17 uses other road links (except the road links excluded in Step S6) to perform interpolation between the adjacent condition-satisfied links 26, thereby searching for (creating) a route including the condition-satisfied links 26.

In Embodiment 1, the setting conditions include not only the aforementioned link continuity and fore-and-aft relation but also a waypoint, a search mode and a search option which are currently set. The search mode is an essential item indicating an object on which attention is to be focused for route search. Examples of the search mode include time priority such that attention is focused on the times of arrival, distance priority such that attention is focused on route distances, and fuel efficiency priority such that attention is focused on fuel efficiency. The search option is an optional item indicating an object on which attention is to be focused for route search. Examples of the search option include whether to use an expressway or not, whether to use an ordinary road or not, whether to use a tunnel or not, whether to use a ferry route or not, whether to use traffic information received by the communication unit 15 or not, and whether to use learning information indicating the tendency of road traveling based on past traveling history or not.

As mentioned above, the link continuity and fore-and-aft relation, the waypoint, the search mode and the search option are set in the setting conditions used herein. Thus, the route searching unit 17 searches for (creates) a route in consideration for the condition-satisfied links 26, the link continuity and fore-and-aft relation, the waypoint, the search mode and the search option. However, setting conditions are not limited to this.

Figure 7:
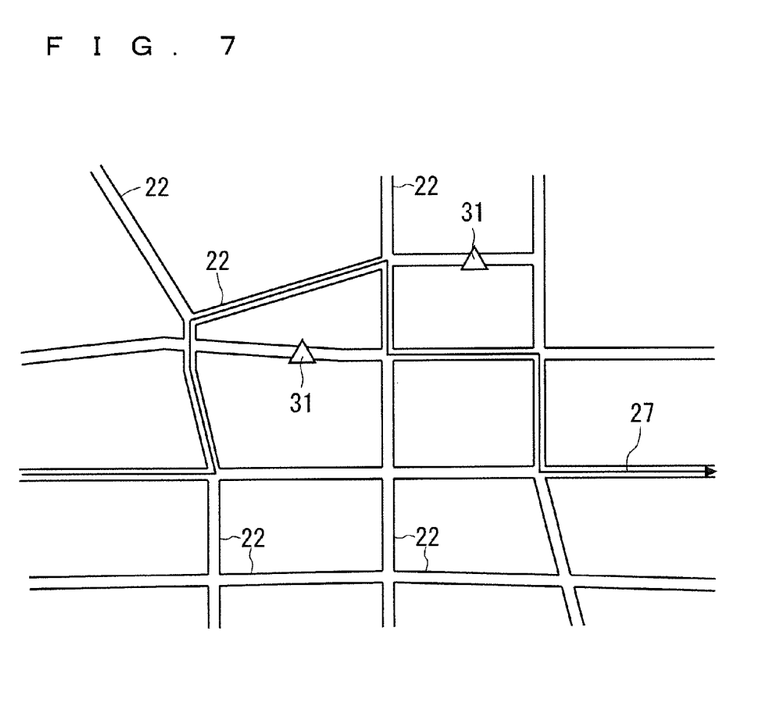
FIG. 7 is a view showing the operation of the route creation device according to Embodiment 1.

An exemplary route 27 searched for by the route searching unit 17 is shown in the form of an arrow in FIG. 7. Thereafter, the operation shown in FIG. 2 is completed, and the route 27 searched for by the route searching unit 17 is used for display on the display 18 and the like.

The route creation device 1 according to Embodiment 1 as described above searches for a route including at least one road link satisfying the predetermined condition among the road links retrieved (acquired) by the link retrieval unit 16 and corresponding to the freehand line. Thus, the route creation device 1 is capable of searching for a route intended by the user (or a route close to the intended route) because of its capability of searching for a route passing through the road links corresponding to the freehand line, as much as possible.

According to Embodiment 1, the retrieval range is defined with reference to each point on the freehand line, and road links positioned within the retrieval range are retrieved. This allows the acquisition of the road links close in distance to the freehand line.

According to Embodiment 1, the search for a route is made based on the at least one road link satisfying the predetermined condition and the setting conditions set in relation to the route search. This allows the search for a route which passes through the road links corresponding to the freehand line, as much as possible, and which satisfies the setting conditions in relation to the route search, so that the search for a route which reflects user's intention more (or a route closer thereto) is made. In particular, the provision of a simple and appropriate route with a small number of right and left turns without taking a circuitous route is expected by taking the link continuity and fore-and-aft relation into consideration.

Also according to Embodiment 1, the road link of the expressway ramp and the impassable road link are excluded from among the road links retrieved (acquired) by the link retrieval unit 16 and corresponding to the freehand line. This achieves a search for an appropriate route, and reduction of processing burdens required for the search regarding the search made by the route searching unit 17 because of the decrease in the number of road links.

Also, Embodiment 1, which is capable of making a search for a route between two points, i.e., one end and the other end of the freehand line, is applicable to a situation in which a destination point or a waypoint has not yet been set (a situation in which the current route is absent). Of course, Embodiment 1 is applicable to a situation in which a destination point or a waypoint has already been set (a situation in which the current route is present).

<Modification 1>

Figure 8:
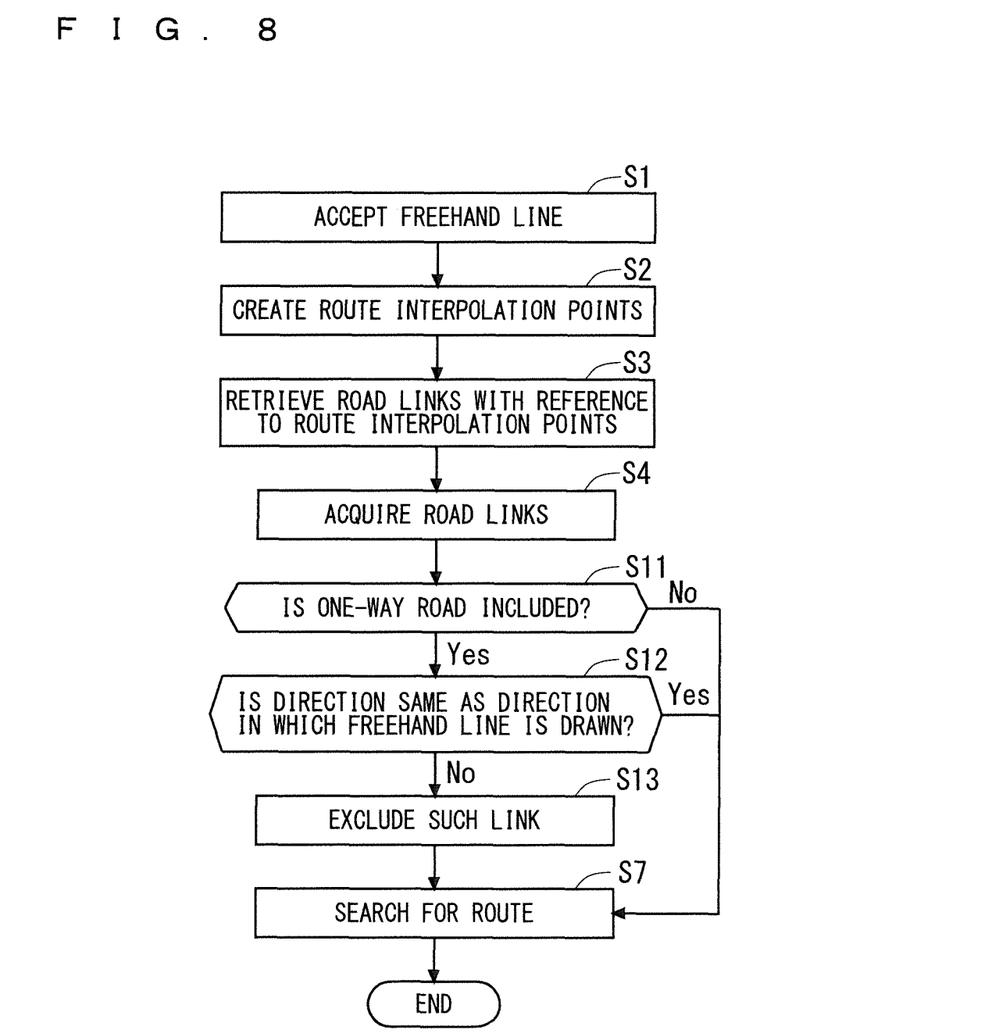
FIG. 8 is a flow diagram showing the operation of the route creation device according to Modification 1 of Embodiment 1.

FIG. 8 is a flow diagram showing an example of the operation of the route creation device 1 according to Modification 1 of Embodiment 1. The flow diagram shown in FIG. 8 is such that Steps S5 and S6 in the flow diagram shown in FIG. 2 are changed to Steps S11 to S13. Only Steps S11 to S13, and Steps S4 and S7 before and after Steps S11 to S13 will be described below.

Figure 9:
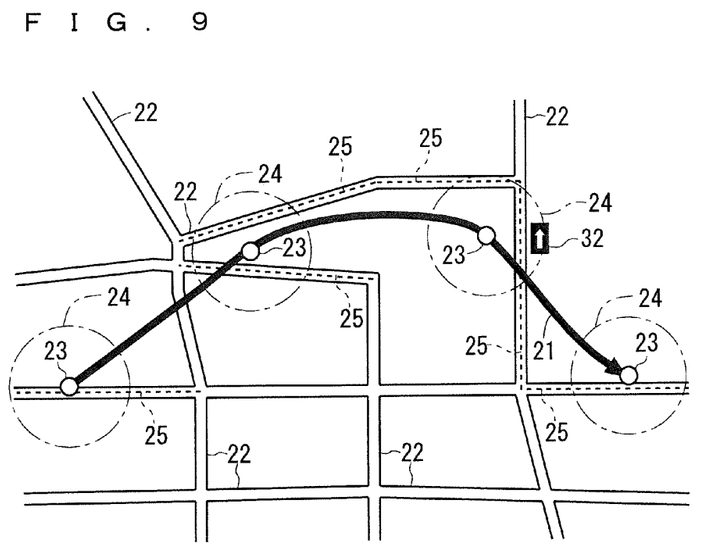
FIG. 9 is a view showing the operation of the route creation device according to Modification 1 of Embodiment 1.

In Step S4, the link retrieval unit 16 initially acquires retrieved links 25 as a result of the retrieval of Step S3 in the aforementioned manner to store the retrieved links 25 in the storage 13. In FIG. 9, the retrieved links 25 acquired in Step S4 are indicated by broken lines. In FIG. 9, a one-way passable direction is indicated by a hollow arrow 32 in a quadrangular frame.

In Step S11, the controller 19 acquires the road types and attributes, as in Step S5. Based on the acquired road types and attributes, the controller 19 then judges whether a one-way road link is included among the retrieved links 25 in the storage 13 or not. When it is judged that the one-way road link is included among the retrieved links 25, the procedure proceeds to Step S12; otherwise, the procedure proceeds to Step S7.

In Step S12, the controller 19 judges whether the direction of the one-way road link judged in Step S11 is the same as the direction in which the freehand line 21 is drawn in Step S1 or not. When it is judged that the direction of the one-way road link judged in Step S11 is the same as the direction in which the freehand line 21 is drawn in Step S1, the procedure proceeds to Step S7. When it is judged that the direction of the one-way road link judged in Step S11 is opposite from the direction in which the freehand line 21 is drawn in Step S1, the procedure proceeds to Step S13.

Figure 10:
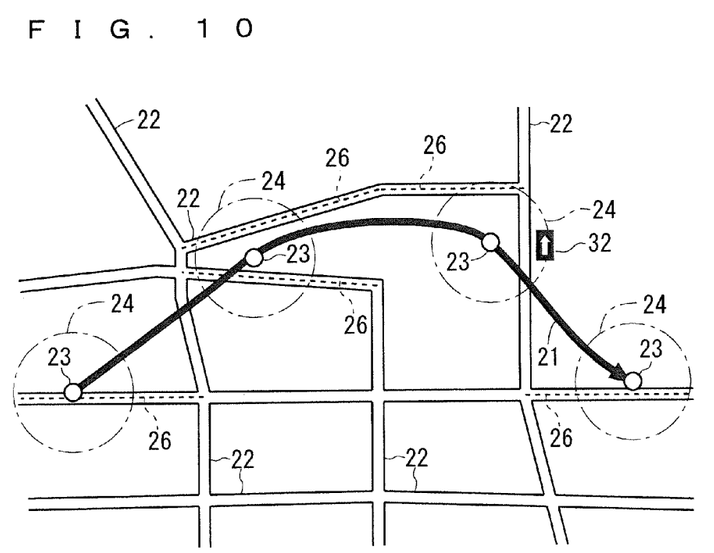
FIG. 10 is a view showing the operation of the route creation device according to Modification 1 of Embodiment 1.

In Step S13, the controller 19 excludes the one-way road link judged in Step S12 (the road link impassable in the same direction as the direction in which the freehand line 21 is drawn in Step S1) from among the retrieved links 25 in the storage 13 to identify the remainder of the retrieved links 25. That is, the retrieved links 25 each of which satisfies the condition (predetermined condition) of being passable in the same direction as the direction in which the freehand line 21 is drawn (that is, the aforementioned condition-satisfied links) are identified. In FIG. 10, the condition-satisfied links 26 obtained by excluding the one-way road link 22 impassable in direction of the hollow arrow 32 in the quadrangular frame from among the retrieved links 25 shown in FIG. 9 are indicated by broken lines. Thereafter, the procedure proceeds to Step S7.

In Step S7, the route searching unit 17 searches for a route including the condition-satisfied links 26, based on the condition-satisfied links 26 and the setting conditions set in relation to the route search, as in Embodiment 1.

Figure 11:
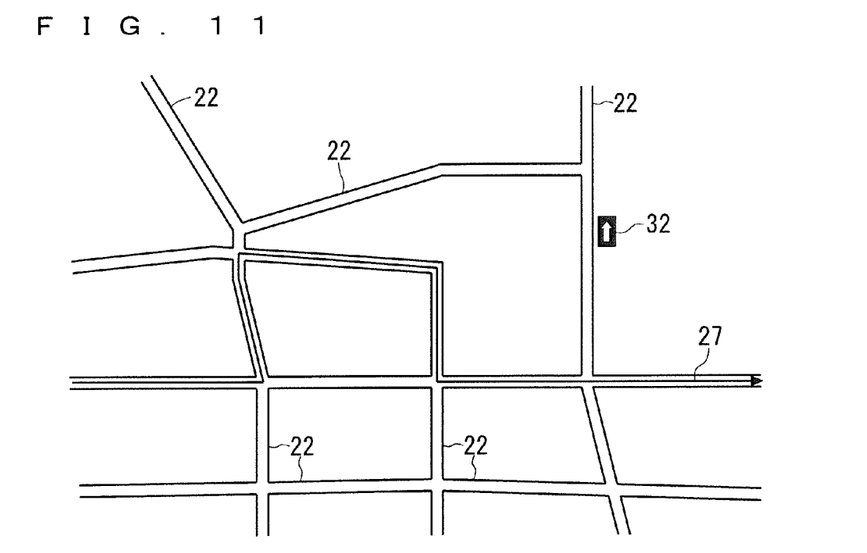
FIG. 11 is a view showing the operation of the route creation device according to Modification 1 of Embodiment 1.

An exemplary route 27 searched for by the route searching unit 17 is shown in the form of an arrow in FIG. 11. Thereafter, the operation shown in FIG. 8 is completed, and the route 27 searched for by the route searching unit 17 is used for display on the display 18 and the like.

In the route creation device 1 according to Modification 1 as described above, the road link impassable in the same direction as the direction in which the freehand line is drawn in the input unit 14 is excluded from among the road links retrieved (acquired) by the link retrieval unit 16 and corresponding to the freehand line. This achieves a search for an appropriate route passable in actuality and fitting with user's sense, and reduction of processing burdens required for the search regarding the route searching unit 17 because of the decrease in the number of road links.

Steps S5 and S6 in the flow diagram shown in FIG. 2 are changed to Steps S11 to S13 shown in FIG. 8 in the above description. The present invention, however, is not limited to this. Steps S5 and S6 and Steps S11 to S13 may be combined together for exclusion of road links.

<Modification 2>

Figure 12:
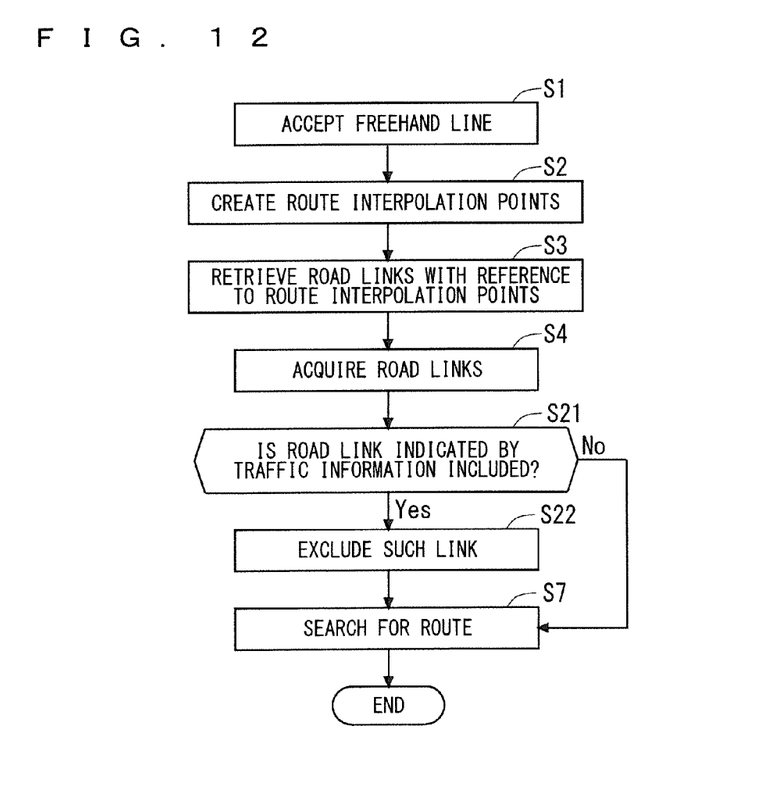
FIG. 12 is a flow diagram showing the operation of the route creation device according to Modification 2 of Embodiment 1.

FIG. 12 is a flow diagram showing an example of the operation of the route creation device 1 according to Modification 2 of Embodiment 1. The flow diagram shown in FIG. 12 is such that Steps S5 and S6 in the flow diagram shown in FIG. 2 are changed to Steps S21 and S22. Only Steps S21 and S22 will be described below.

First, in Step S21, the controller 19 acquires the road types and attributes, as in Step S5. Based on the acquired road types and attributes, the controller 19 then judges whether a road link on which a traffic jam, an accident, a construction or a disaster is indicated in the traffic information received by the communication unit 15 is included among the retrieved links 25 in the storage 13 or not. When it is judged that such a road link is included among the retrieved links 25, the procedure proceeds to Step S22; otherwise, the procedure proceeds to Step S7.

In Step S22, the controller 19 excludes the road link on which a traffic jam, an accident, a construction or a disaster is indicated in the traffic information from among the retrieved links 25 in the storage 13 to identify the remainder of the retrieved links 25. That is, the retrieved links 25 each of which satisfies the condition (predetermined condition) of not being a road link on which a traffic jam, an accident, a construction or a disaster occurs (that is, the aforementioned condition-satisfied links) are identified. Thereafter, the procedure proceeds to Step S7.

In the route creation device 1 according to Modification 2 as described above, the road link indicated by the traffic information and having a problem in passage therethrough is excluded from among the road links retrieved (acquired) by the link retrieval unit 16 and corresponding to the freehand line. This achieves a search for an appropriate route, and reduces processing burdens required for the search because of the decrease in the number of road links.

Steps S5 and S6 in the flow diagram shown in FIG. 2 are changed to Steps S21 and S22 shown in FIG. 12 in the above description. The present invention, however, is not limited to this. Steps S5 and S6 and Steps S21 and S22 may be combined together for exclusion of road links. Alternatively, this combination is further combined with Steps S11 to S13 described in Modification 1 for exclusion of road links.

According to the present invention, the embodiment may be modified or dispensed with, as appropriate, within the scope of the present invention.

DESCRIPTION OF REFERENCE SIGNS

1 Route creation device, 12 Map data storage, 14 Input unit, 15 Communication unit, 16 Link retrieval unit, 17 Route searching unit, 21 Freehand line, 22 Road links, 23 Route interpolation points, 24 Retrieval ranges, 25 Retrieved links, 26 Condition-satisfied links, and 27 Route.

The invention claimed is:

1. A route creation device comprising:
   a map data storage that stores map data therein;
   a touch panel to display a map based on said map data and accept a line drawn on said map regardless of a setting situation of a destination point or a waypoint;
   a controller that determines a predetermined range with reference to a point on the drawn line and that retrieves, from said map data, corresponding road links positioned within the predetermined range, the line being accepted by said input unit; and
   said controller performing a search for a navigation route including at least one road link satisfying a predetermined condition including link continuity and fore-and-aft relation among the retrieved road links,
   said controller, for each point drawn on said line, identifying a plurality of road links and determining the shortest distance between an end of a road link identified from an adjacent point drawn on said line and each end of said plurality of road links so as to retrieve one road link whose distance is shortest, as said corresponding road link.

2. The route creation device according to claim 1, wherein said controller defines a predetermined range with reference to a point on the line accepted by said touch panel to retrieve road links positioned within the predetermined range as said corresponding road links.

3. The route creation device according to claim 2, wherein said controller searches for said route, based on setting conditions set in relation to the route search and the at least one road link satisfying said predetermined condition, the at least one road link being the remainder obtained by excluding a predetermined road link from among the road links retrieved by said controller.

4. The route creation device according to claim 3, wherein said predetermined road link to be excluded is a road link of an expressway ramp or an impassable road link.

5. The route creation device according to claim 3, wherein said predetermined road link to be excluded is a road link impassable in the same direction as a direction in which said line is drawn in said input unit.

6. The route creation device according to claim 3, further comprising
   a communication device that receives traffic information,
   wherein said predetermined road link to be excluded is a road link indicated by the traffic information received by said communication device.

* * * * *